(12) United States Patent
Arimilli et al.

(10) Patent No.: US 6,473,833 B1
(45) Date of Patent: Oct. 29, 2002

(54) INTEGRATED CACHE AND DIRECTORY STRUCTURE FOR MULTI-LEVEL CACHES

(75) Inventors: Ravi Kumar Arimilli, Austin; Leo James Clark, Georgetown; James Stephen Fields, Jr.; Lakshminarayana Baba Arimilli, both of Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/364,570

(22) Filed: Jul. 30, 1999

(51) Int. Cl.[7] .................. G06F 12/00; G06F 12/08
(52) U.S. Cl. .................. 711/122; 711/3; 711/118; 711/119; 711/123; 711/126; 711/137
(58) Field of Search ................ 711/122, 137, 711/3, 128, 119, 118, 124

(56) References Cited

U.S. PATENT DOCUMENTS

| | | | |
|---|---|---|---|
| 5,611,063 A | 3/1997 | Loper et al. | |
| 5,740,399 A | 4/1998 | Mayfield et al. | |
| 5,758,119 A | 5/1998 | Mayfield et al. | |
| 5,778,434 A | 7/1998 | Nguyen et al. | |
| 5,813,031 A | * 9/1998 | Chou et al. | 711/122 |
| 5,926,831 A | 7/1999 | Revilla et al. | |
| 5,944,815 A | 8/1999 | Witt | |
| 5,983,324 A | 11/1999 | Ukai et al. | |
| 6,026,482 A | 2/2000 | Witt et al. | |
| 6,076,146 A | 7/2000 | Tran et al. | |
| 6,085,291 A | 7/2000 | Hicks et al. | |
| 6,088,789 A | 7/2000 | Witt | |
| 6,119,218 A | 9/2000 | Arora et al. | |
| 6,138,209 A | * 10/2000 | Krolak et al. | 711/128 |
| 6,151,662 A | 11/2000 | Christie et al. | |
| 6,157,988 A | 12/2000 | Dowling | |
| 6,212,602 B1 | * 4/2001 | Wicki et al. | 711/122 |
| 6,233,645 B1 | 5/2001 | Chrysos et al. | |

* cited by examiner

Primary Examiner—Do Hyun Yoo
Assistant Examiner—Jasmine Song
(74) Attorney, Agent, or Firm—Casimer K. Salys; Bracewell & Patterson, L.L.P.

(57) ABSTRACT

A method of operating a multi-level memory hierarchy of a computer system and an apparatus embodying the method, wherein multiple levels of storage subsystems are used to improve the performance of the computer system, each next higher level generally having a faster access time, but a smaller amount of storage. Values within a level are indexed by a directory that provides an indexing of information relating the values in that level to the next lower level. In a preferred embodiment of the invention, the directories for the various levels of storage are contained within the next higher level, providing a faster access to the directory information. Cache memories used as the highest levels of storage, and one or more sets are allocated out of that cache memory for containing a directory of the next lower level of storage. An address comparator which is used to compare entries in a directory to address values is directly coupled to the set or sets used for the directory, reducing the time needed to compare addresses in determining whether an address is present in the cache.

8 Claims, 7 Drawing Sheets

INTEGRATED CACHE AND DIRECTORY STRUCTURE FOR MULTI-LEVEL CACHES

CROSS REFERENCE TO RELATED APPLICATIONS

The present invention is related to the following applications filed concurrently with this application: U.S. patent application Ser. No. 09/364,574 entitled "METHOD AND SYSTEM FOR CANCELLING SPECULATIVE CACHE PREFETCH REQUESTS"; U.S. patent application Ser. No. 09/364,408 entitled "METHOD AND SYSTEM FOR CLEARING DEPENDENT SPECULATIONS FROM A REQUEST QUEUE"; U.S. patent application Ser. No. 09/364,409 entitled "METHOD AND SYSTEM FOR MANAGING SPECULATIVE REQUESTS IN A MULTI-LEVEL MEMORY HIERARCHY". The present invention also relates to U.S. patent application Ser. No. 09/339,410 entitled "A SET-ASSOCIATIVE CACHE MEMORY HAVING ASYMMETRIC LATENCY AMONG SETS" filed Jun. 24, 1999 having at least one common inventor and assigned to the same assignee. The specification is incorporated herein by reference.

BACKGROUND OF THE INVENTION

1. Field of the Invention

The present invention generally relates to computer systems, and more specifically to an improved method of prefetching values (instructions or operand data) used by a processor core of a computer system. In particular, the present invention makes more efficient use of a cache hierarchy working in conjunction with prefetching (speculative requests).

2. Description of Related Art

The basic structure of a conventional computer system includes one or more processing units connected to various input/output devices for the user interface (such as a display monitor, keyboard and graphical pointing device), a permanent memory device (such as a hard disk, or a floppy diskette) for storing the computer's operating system and user programs, and a temporary memory device (such as random access memory or RAM) that is used by the processor(s) in carrying out program instructions. The evolution of computer processor architectures has transitioned from the now widely-accepted reduced instruction set computing (RISC) configurations, to so-called superscalar computer architectures, wherein multiple and concurrently operable execution units within the processor are integrated through a plurality of registers and control mechanisms.

The objective of superscalar architecture is to employ parallelism to maximize or substantially increase the number of program instructions (or "micro-operations") simultaneously processed by the multiple execution units during each interval of time (processor cycle), while ensuring that the order of instruction execution as defined by the programmer is reflected in the output. For example, the control mechanism must manage dependencies among the data being concurrently processed by the multiple execution units, and the control mechanism must ensure that integrity of sequentiality is maintained in the presence of precise interrupts and restarts. The control mechanism preferably provides instruction deletion capability such as is needed with instruction-defined branching operations, yet retains the overall order of the program execution. It is desirable to satisfy these objectives consistent with the further commercial objectives of minimizing electronic device count and complexity.

An illustrative embodiment of a conventional processing unit for processing information is shown in FIG. 1, which depicts the architecture for a PowerPC™ microprocessor 12 manufactured by International Business Machines Corp. (IBM—assignee of the present invention). Processor 12 operates according to reduced instruction set computing (RISC) techniques, and is a single integrated circuit superscalar microprocessor. As discussed further below, processor 12 includes various execution units, registers, buffers, memories, and other functional units, which are all formed by integrated circuitry.

Processor 12 is coupled to a system bus 20 via a bus interface unit (BIU) 30 within processor 12. BIU 30 controls the transfer of information between processor 12 and other devices coupled to system bus 20 such as a main memory 18. Processor 12, system bus 20, and the other devices coupled to system bus 20 together form a host data processing system. Bus 20, as well as various other connections described, include more than one line or wire, e.g., the bus could be a 32-bit bus. BIU 30 is connected to a high speed instruction cache 32 and a high speed data cache 34. A lower level (L2) cache (not shown) may be provided as an intermediary between processor 12 and system bus 20. An L2 cache can store a much larger amount of information (instructions and operand data) than the on-board caches can, but at a longer access penalty. For example, the L2 cache may be a chip having a storage capacity of 512 kilobytes, while the processor may be an IBM PowerPC™ 604-series processor having on-board caches with 64 kilobytes of total storage. A given cache line usually has several memory words, e.g., a 64-byte line contains eight 8-byte words.

The output of instruction cache 32 is connected to a sequencer unit 36 (instruction dispatch unit, also referred to as an instruction sequence unit or ISU). In response to the particular instructions received from instruction cache 32, sequencer unit 36 outputs instructions to other execution circuitry of processor 12, including six execution units, namely, a branch unit 38, a fixed-point unit A (FXUA) 40, a fixed-point unit B (FXUB) 42, a complex fixed-point unit (CFXU) 44, a load/store unit (LSU) 46, and a floating-point unit (FPU) 48.

The inputs of FXTJA 40, FXUB 42, CFXU 44 and LSU 46 also receive source operand information from general-purpose registers (GPRs) 50 and fixed-point rename buffers 52. The outputs of FXUA 40, FXUB 42, CFXU 44 and LSU 46 send destination operand information for storage at selected entries in fixed-point rename buffers 52. CFXU 44 further has an input and an output connected to special-purpose registers (SPRs) 54 for receiving and sending source operand information and destination operand information, respectively. An input of FPU 48 receives source operand information from floating-point registers (FPRs) 56 and floating-point rename buffers 58. The output of FPU 48 sends destination operand information to selected entries in floating-point rename buffers 58.

As is well known by those skilled in the art, each of execution units 38–48 executes one or more instructions within a particular class of sequential instructions during each processor cycle. For example, FXUA 42 performs fixed-point mathematical operations such as addition, subtraction, ANDing, ORing, and XORing utilizing source operands received from specified GPRs 50. Conversely, FPU 48 performs floating-point operations, such as floating-point multiplication and division, on source operands received from FPRs 56. As its name implies, LSU 46 executes floating-point and fixed-point instructions which either load operand data from memory (i.e., from data cache 34) into selected GPRs 50 or FPRs 56, or which store data from selected GPRs 50 or FPRs 56 to memory 18. Processor 12 may include other registers, such as configuration registers, memory management registers, exception handling registers, and miscellaneous registers, which are not shown.

Processor 12 carries out program instructions from a user application or the operating system, by routing the instructions and operand data to the appropriate execution units, buffers and registers, and by sending the resulting output to the system memory device (RAM), or to some output device such as a display console or printer. A computer program can be broken down into a collection of processes which are executed by the processor(s). The smallest unit of operation to be performed within a process is referred to as a thread. The use of threads in modern operating systems is well known. Threads allow multiple execution paths within a single address space (the process context) to run concurrently on a processor. This "multithreading" increases throughput in a multi-processor system, and provides modularity in a uni-processor system.

One problem with conventional processing is that operations are often delayed as they must wait on an instruction or item of data before processing of a thread may continue. One way to mitigate this effect is with multithreading, which allows the processor to switch its context and run another thread that is not dependent upon the requested value. Another approach to reducing overall memory latency is the use of caches, as discussed above. A related approach involves the prefetching of values. "Prefetching" refers to the speculative retrieval of values (operand data or instructions) from the memory hierarchy, and the temporary storage of the values in registers or buffers near the processor core, before they are actually needed. Then, when the value is needed, it can quickly be supplied to the sequencer unit, after which it can be executed (if it is an instruction) or acted upon (if it is data). Prefetch buffers differ from a cache in that a cache may contain values that were loaded in response to the actual execution of an operation (a load or i-fetch operation), while prefetching retrieves values prior to the execution of any such operation.

An instruction prefetch queue may hold, e.g., eight instructions to provide look-ahead capability. Branch unit 38 searches the instruction queue in sequencer unit 36 (typically only the bottom half of the queue) for a branch instruction and uses static branch prediction on unresolved conditional branches to allow the IFU to speculatively request instructions from a predicted target instruction stream while a conditional branch is evaluated (branch unit 38 also folds out branch instructions for unconditional branches). Static branch prediction is a mechanism by which software (for example, a compiler program) can give a hint to the computer hardware about the direction that the branch is likely to take. In this manner, when a correctly predicted branch is resolved, instruction execution continues without interruption along the predicated path. If branch prediction is incorrect, the IFU flushes all instructions from the instruction queue. Instruction issue then resumes with the instruction from the correct path.

A prefetch mechanism for operand data may also be provided within bus interface unit 30. This prefetch mechanism monitors the cache operations (i.e., cache misses) and detects data streams (requests to sequential memory lines). Based on the detected streams and using known patterns, BIU 30 speculatively issues requests for operand data which have not yet been requested. BIU 30 can typically have up to four outstanding (detected) streams. Reload buffers are used to store the data until requested by data cache 34.

In spite of such approaches to reducing the effects of memory latencies, there are still significant delays associated with operations requiring memory access. As alluded to above, one cause of such delays is the incorrect prediction of a branch (for instructions) or a stream (for operand data). In the former case, the unused, speculatively requested instructions must be flushed, directly stalling the core. In the latter case, missed data is not available in the prefetch reload queues, and a considerable delay is incurred while the data is retrieved from elsewhere in the memory hierarchy. Much improvement is needed in the prefetching mechanism.

Another cause of significant delay is related to the effects that prefetching has on the cache hierarchy. For example, in multi-level cache hierarchies, it might be efficient under certain conditions to load prefetch values into lower cache levels, but not into upper cache levels. Also, when a speculative prefetch request misses a cache, the request may have to be retried an excessive number of times (when the lower level storage subsystem is busy), which unnecessarily wastes bus bandwidth, and the requested value might not ever be used. Furthermore, a cache can easily become "polluted" with speculative request data, i.e., the cache contains so much prefetch data that demand requests (those requests arising from actual load or i-fetch operations) frequently miss the cache. In this case the prefetch mechanism has overburdened the capacity of the cache, which can lead to thrashing. The cache replacement/victimization algorithm (such as a least-recently used, or LRU, algorithm) cannot account for the nature of the prefetch request. Moreover, after prefetched data has been used by the core (and is no longer required), it may stay in the cache for a relatively long time due to the LRU algorithm and might thus indirectly contribute to further cache misses (which is again particularly troublesome with misses of demand requests, rather than speculative requests). Finally, in multi-processor systems wherein one or more caches are shared by a plurality of processors, prefetching can result in uneven (and inefficient) use of the cache with respect to the sharing processors.

Another cause of delay related to multi-level cache hierarchies is the need to access a directory for each level, typically contained within that particular storage level. Directories provide means for indexing values in the data portion of the cache, and also maintain information about whether a cache entry is valid or whether it is "dirty" which means that the data is conditionally invalid due to access by another cache user in a multiprocessor system. Entries in a directory are matched with addresses of values to determine whether the value is present in the level, or must be loaded. The presence of a value is determined by comparing the tag associated with the address of that value with entries in the directory. This is a time consuming process, which can stall the access to the cache waiting for the match to be found.

In light of the foregoing, it would be desirable to provide a method of speeding up core processing by improving the prefetching and cache mechanisms, particularly with respect to the interaction of the prefetching mechanism with the cache hierarchy. It would be further advantageous if the method allowed a programmer to optimize various features of the prefetching mechanism.

SUMMARY OF THE INVENTION

It is therefore one object of the present invention to provide an improved cache for a computer system, having a mechanism for improving access to instructions and/or operand data.

It is yet another object of the present invention to provide a computer system that makes more efficient use of a cache hierarchy by improving access to directories in the cache hierarchy.

The foregoing objects are achieved in methods and apparatus for operating a multi-level cache memory in a computer system, comprising the steps of creating a directory describing the contents of a lower-level cache; assigning at least one set from a higher-level cache to contain the directory, and holding the directory in the set(s). The set or sets can further be reassigned to general use if a lower-level cache is detected as absent. This method and apparatus may be nested in that more than one level in a multi-level cache may contain the directory of the next lower level in one or more of its sets. An address comparator may be attached directly to the set, allowing for rapid comparison of the directory entries with address values. A cache may be of a variable latency type, and the set for use with the directory may be specifically chosen based on the latency of the set.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF AN ILLUSTRATIVE EMBODIMENT

Figure 1:
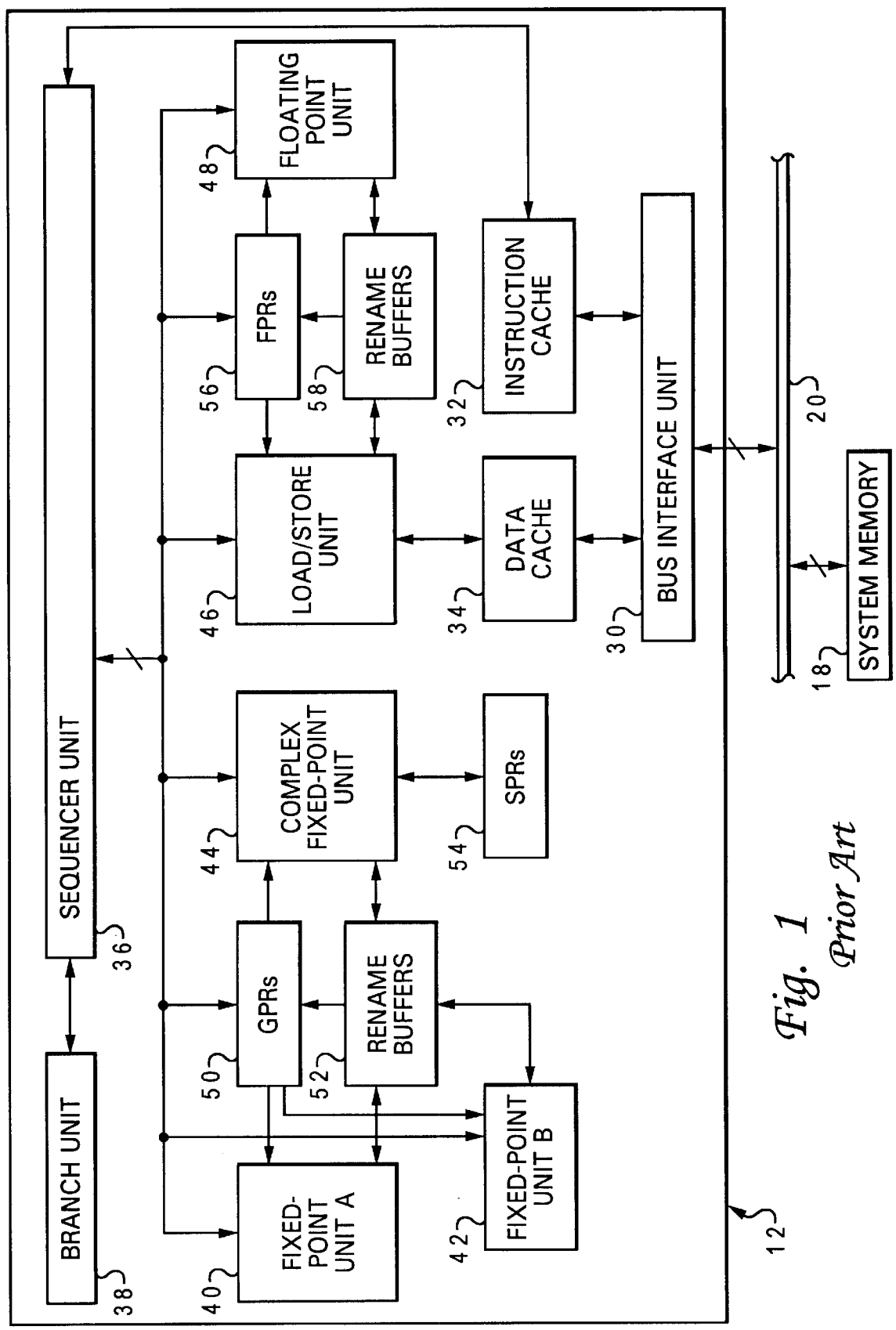
FIG. 1 is a block diagram of a conventional superscalar computer processor, depicting execution units, buffers, registers, and the on-board (L1) data and instruction caches.
Figure 2:
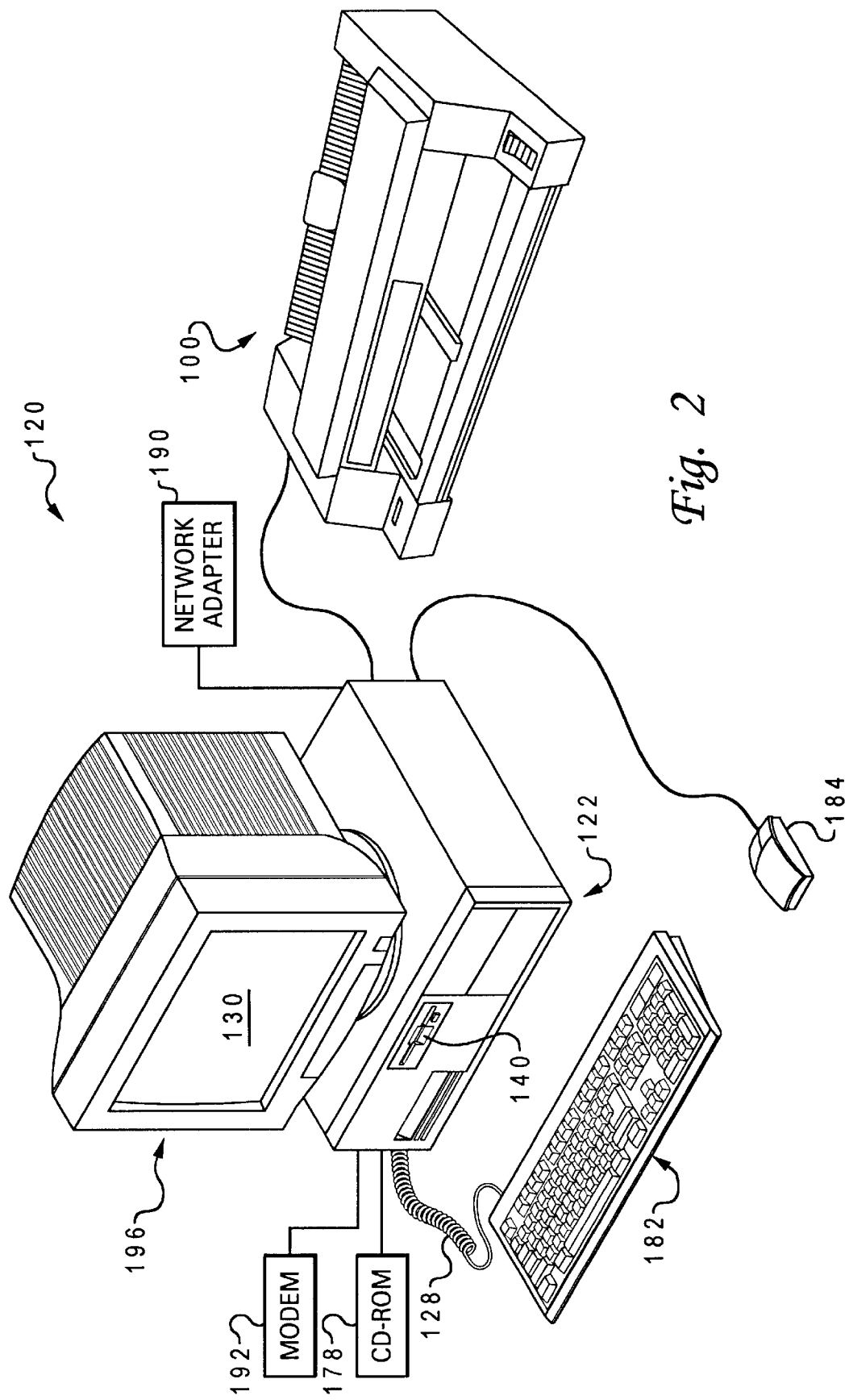
FIG. 2 is an illustration of one embodiment of a data processing system in which the present invention can be practiced.

With reference now to the figures, and in particular with reference to FIG. 2, a data processing system 120 is shown in which the present invention can be practiced. The data processing system 120 includes processor 122, keyboard 182, and display 196. Keyboard 182 is coupled to processor 122 by a cable 128. Display 196 includes display screen 130, which may be implemented using a cathode ray tube (CRT), a liquid crystal display (LCD), an electrode luminescent panel or the like. The data processing system 120 also includes pointing device 184, which may be implemented using a track ball, a joy stick, touch sensitive tablet or screen, track path, or as illustrated a mouse. The pointing device 184 may be used to move a pointer or cursor on display screen 130. Processor 122 may also be coupled to one or more peripheral devices such a modem 192, CD-ROM 178, network adapter 190, and floppy disk drive 140, each of which may be internal or external to the enclosure or processor 122. An output device such as a printer 100 may also be coupled with processor 122.

It should be noted and recognized by those persons of ordinary skill in the art that display 196, keyboard 182, and pointing device 184 may each be implemented using any one of several known off-the-shelf components.

Figure 3:
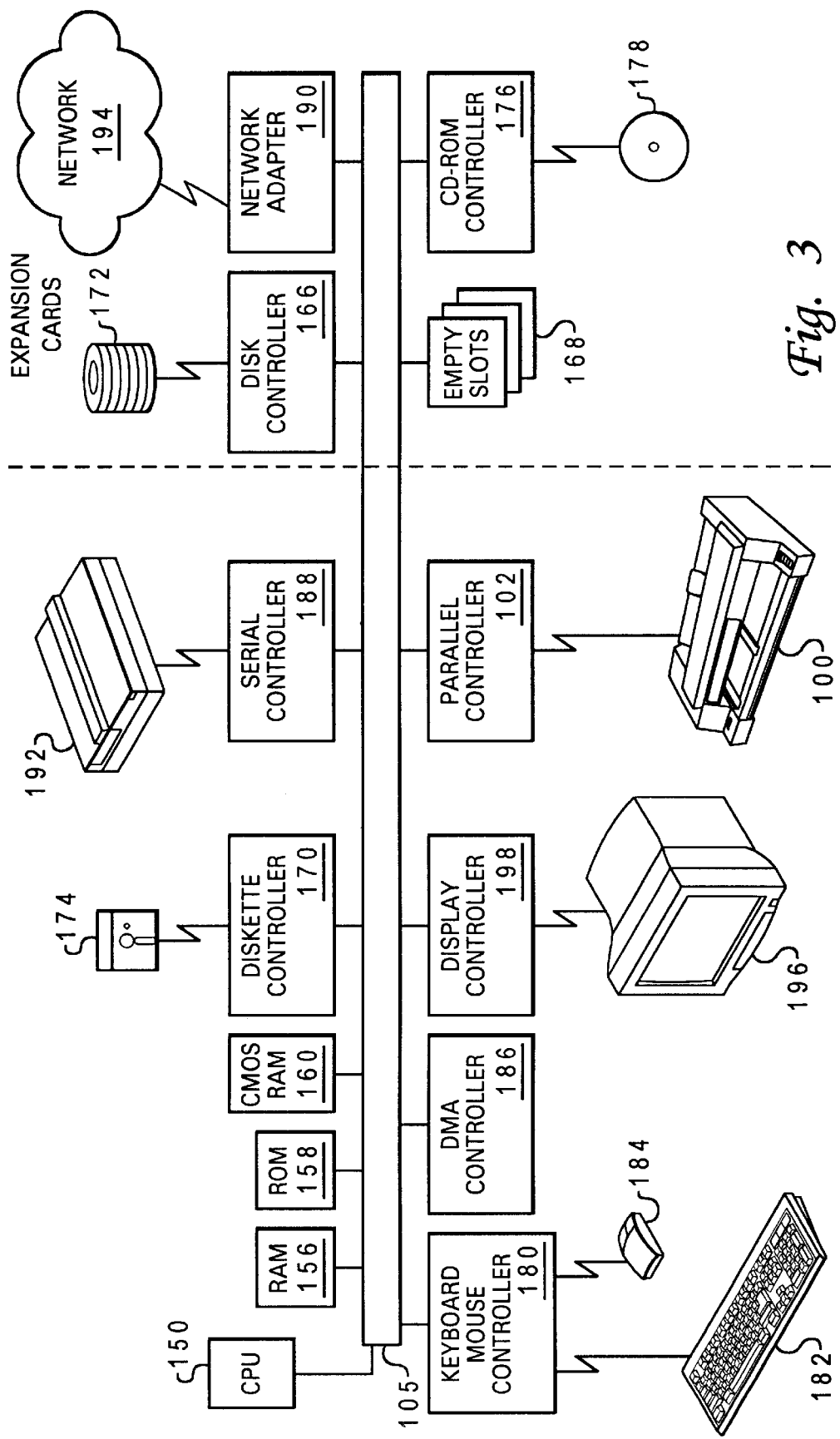
FIG. 3 is a block diagram illustrating selected components that can be included in the data processing system of FIG. 2 according to the teachings of the present invention.

Reference now being made to FIG. 3, a high level block diagram is shown illustrating selected components that can be included in the data processing system 120 of FIG. 2 according to the teachings of the present invention. The data processing system 120 is controlled primarily by computer readable instructions, which can be in the form of software, wherever, or by whatever means such software is stored or accessed. Such software may be executed within the Central Processing Unit (CPU) 150 to cause data processing system 120 to do work.

Memory devices coupled to system bus 105 include Random Access Memory (RAM) 156, Read Only Memory (ROM) 158, and nonvolatile memory 160. Such memories include circuitry that allows information to be stored and retrieved. ROMs contain stored data that cannot be modified. Data stored in RAM can be changed by CPU 150 or other hardware devices. Nonvolatile memory is memory that does not lose data when power is removed from it. Nonvolatile memories include ROM, EPROM, flash memory, or battery-pack CMOS RAM. As shown in FIG. 3, such battery-pack CMOS RAM may be used to store configuration information.

An expansion card or board is a circuit board that includes chips and other electronic components connected that adds functions or resources to the computer. Typically, expansion cards add memory, disk-drive controllers 166, video support, parallel and serial ports, and internal modems. For lap top, palm top, and other portable computers, expansion cards usually take the form of PC cards, which are credit card-sized devices designed to plug into a slot in the side or back of a computer. An example of such a slot is PCMCIA slot (Personal Computer Memory Card International Association) which defines type I, II and III card slots. Thus, empty slots 168 may be used to receive various types of expansion cards or PCMCIA cards.

Disk controller 166 and diskette controller 170 both include special purpose integrated circuits and associated circuitry that direct and control reading from and writing to hard disk drive 172, and a floppy disk or diskette 174, respectively. Such disk controllers handle tasks such as positioning read/write head, mediating between the drive and the CPU 150, and controlling the transfer of information to and from memory. A single disk controller may be able to control more than one disk drive.

CD-ROM controller 176 may be included in data processing 120 for reading data from CD-ROM 178 (compact disk read only memory). Such CD-ROMs use laser optics rather than magnetic means for reading data.

Keyboard mouse controller 180 is provided in data processing system 120 for interfacing with keyboard 182 and pointing device 184. Such pointing devices are typically used to control an on-screen element, such as a graphical pointer or cursor, which may take the form of an arrow having a hot spot that specifies the location of the pointer when the user presses a mouse button. Other pointing devices include a graphics tablet, stylus, light pin, joystick, puck, track ball, track pad, and the pointing device sold under the trademark "Track Point" by International Business Machines Corp. (IBM).

Communication between processing system 120 and other data processing systems may be facilitated by serial controller 188 and network adapter 190, both of which are coupled to system bus 105. Serial controller 188 is used to transmit information between computers, or between a computer and peripheral devices, one bit at a time over a single line. Serial communications can be synchronous (controlled by some standard such as a clock) or asynchronous (managed by the exchange of control signals that govern the flow of information). Examples of serial communication standards include RS-232 interface and the RS-422 interface. As illustrated, such serial interface may be used to communicate with modem 192. A modem is a communication device that enables a computer to transmit information over standard telephone lines. Modems convert digital computer signals to interlock signals suitable for communications over telephone lines. Modem 192 can be utilized to connect data processing system 120 to an on-line information service or an Internet service provider. Such service providers may offer software that can be down loaded into data processing system 120 via modem 192. Modem 192 may provide a connection to other sources of software, such as a server, an electronic bulletin board (BBS), or the Internet (including the World Wide Web).

Network adapter 190 may be used to connect data processing system 120 to a local area network 194. Network 194 may provide computer users with means of communicating and transferring software and information electronically. Additionally, network 194 may provide distributed processing, which involves several computers in the sharing of workloads or cooperative efforts in performing a task. Network 194 can also provide a connection to other systems like those mentioned above (a BBS, the Internet, etc.).

Display 196, which is controlled by display controller 198, is used to display visual output generated by data processing system 120. Such visual output may include text, graphics, animated graphics, and video. Display 196 may be implemented with CRT-based video display, an LCD-based flat panel display, or a gas plasma-based flat-panel display. Display controller 198 includes electronic components required to generate a video signal that is sent to display 196.

Printer 100 may be coupled to data processing system 120 via parallel controller 102. Printer 100 is used to put text or a computer-generated image (or combinations thereof) on paper or on another medium, such as a transparency sheet. Other types of printers may include an image setter, a plotter, or a film recorder.

Parallel controller 102 is used to send multiple data and control bits simultaneously over wires connected between system bus 105 and another parallel communication device, such as a printer 100.

CPU 150 fetches, decodes, and executes instructions, and transfers information to and from other resources via the computers main data-transfer path, system bus 105. Such a bus connects the components in a data processing system 120 and defines the medium for data exchange. System bus 105 connects together and allows for the exchange of data between memory units 156, 158, and 160, CPU 150, and other devices as shown in FIG. 3. Those skilled in the art will appreciate that a data processing system constructed in accordance with the present invention may have multiple components selected from the foregoing, including even multiple processors.

Figure 4:
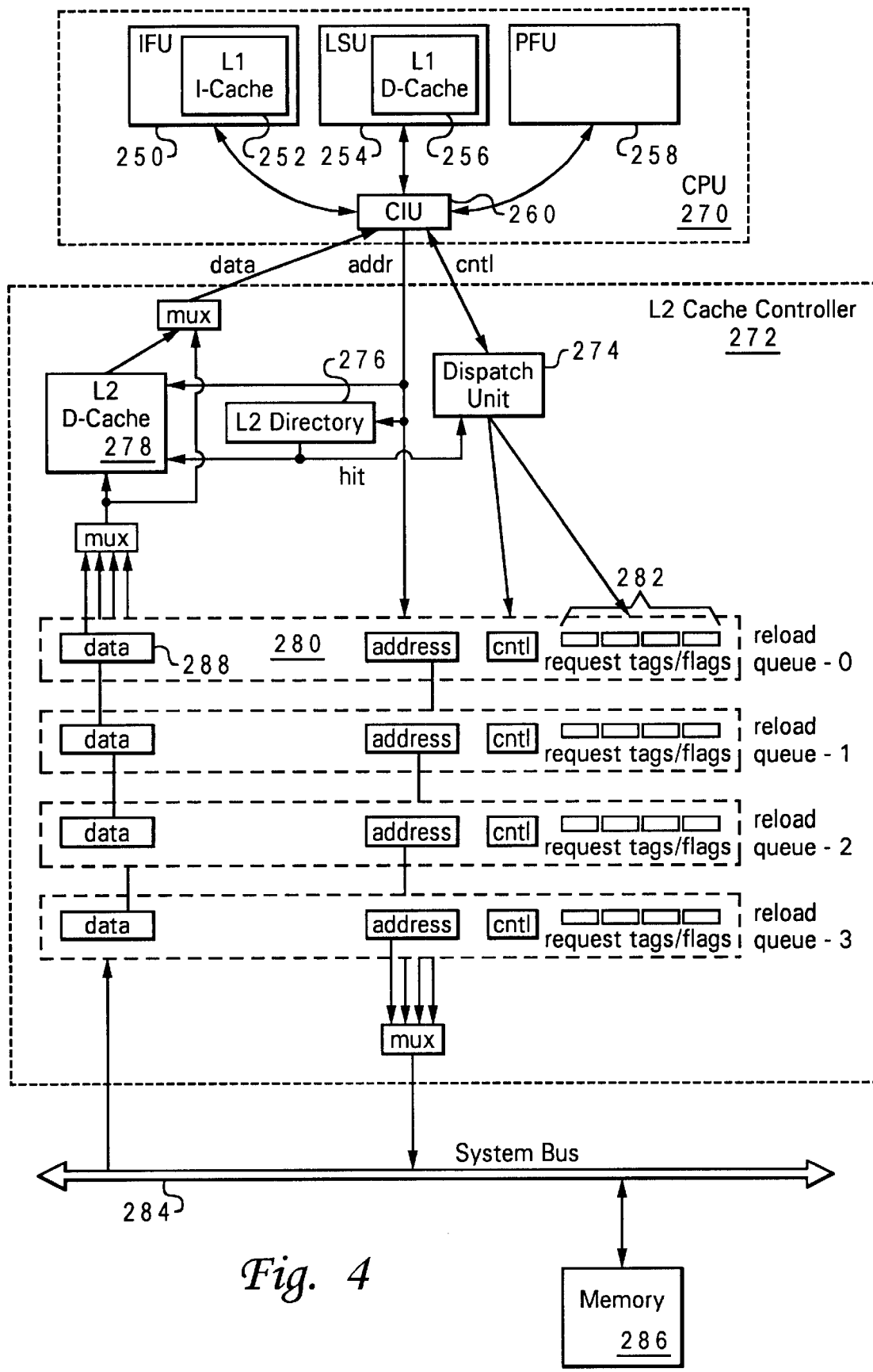
FIG. 4 is a block diagram showing connection of a CPU, L2 cache, bus and memory constructed in accordance with the present invention.

Referring now to FIG. 4, one embodiment of the present invention allows data processing system 120 to more efficiently process information, by utilizing hints in the instruction set architecture used by the processor core of CPU 270 to exploit prefetching. The CPU 270 uses several conventional elements, including a plurality of registers, such as general purpose and special purpose registers (not shown), and a plurality of execution units. CPU 270 is further comprised of several novel elements such as an instruction fetch unit (IFU) 250 containing L1 instruction cache (I-Cache) 252, a load/store unit (LSU) 254 containing L1 operand data cache (D-Cache) 256, and a prefetch unit (PFU) 258. IFU 250 and LSU 254 perform functions which include those performed by conventional execution units, but are further modified to enable the features described hereinafter. IFU 250 executes instruction fetches, while LSU 254 executes instructions which either load operand data from memory, or which store data to memory.

IFU 250 and LSU 254 are connected to the on-board (L1) cache. As shown in FIG. 4, the L1 cache may actually comprise separate operand data and instruction caches. L1 D-cache 256 and L1 I-Cache 252 are further connected to the lower level storage subsystem which, in the illustrated embodiment, includes at least one additional cache level, L2 cache 272, which may also be incorporated on-board. L2 cache 272 may in turn be connected to another cache level, or to the main memory 286, via system bus 284.

PFU 258 is linked to CIU (Core Instruction Unit) 260. The instruction set architecture (ISA) for the processor core (e.g., the ISA of a PowerPC™ 630 processor) is extended to include explicit prefetch instructions (speculative requests). CIU 260 is aware of PFU 258 and issues instructions directly to PFU according to bits in the extended instruction which are set by the software (the computer's operating system or user programs). This approach allows the software to better optimize scheduling of load and store operations (prediction techniques in software may be more accurate than hardware). PFU 258 may be split into an instruction prefetch unit and an operand data prefetch unit.

Prefetch unit 258 issues load requests to L2 cache controller 272, which are queued in reload queue 280. In this figure, four reload queues 280 are shown, but the quantity should be chosen in terms of throughput and device area and can be any number.

As execution of CPU 270 proceeds, cache line load requests which were made by PFU 258 become resolved. Either a commit occurs, which happens when it becomes determined that a particular instruction cache line will be executed, or operand data within that line will be loaded or stored, or the execution of the processor bypasses the use of that cache line, and therefore the line requested is no longer needed.

Performance can be improved by the use of active cancel and commit commands. These commands can be sent by CPU 270, to indicate that a cache line is no longer needed (cancel) or definitely needed (commit). The command can take the form of one or more software signal lines or as an instruction provided to the L1 Caches 252 and 254, or L2 Cache 272. By sending a cancel command to cancel cache requests for lines which are no longer needed as a processor resolves the branch paths through executing, the reload queues 280 become available, improving the performance of the system, since the reload queues 280 are a limited resource. The cancel command may also be sent after a predetermined number of instruction cycles have been executed by the CPU 270 since the load, this has the effect of clearing stale entries. Cancel or commit commands associated with instruction prefetches may be provided by CIU 260 or the IFU 250 to the L1 instruction cache 252. Cancel or commit commands associated with operand data prefetches may be provided by CIU 260 or the LSU 254 to the L1 data cache 256. Committing the cache lines is accomplished by setting one or more bit states which indicate that a particular cache line is to be speculatively loaded to the opposite state. Thus a committed line will now be treated as if it were demand loaded.

The acceptance of the cancel command can be conditioned upon the state of a bus or memory being accessed by the corresponding cancel command. Referring again to FIG. 4 and referring additionally to FIG. 5, a decision diagram is shown for using the state of the system bus 284 to determine whether to cancel a load request. The cancel command may be ignored if the bus cycle has proceeded to the point where the address lines have been driven onto the bus, unless the bus has entered a wait state waiting for the response from slow memory, in which case the load may be cancelled by issuing a "retry" response from L2 cache controller 272 itself. Further, if a non-retry response is received from the bus snoopers after the address transaction has commenced, the load is allowed to proceed. This has the effect of allowing efficient use of the bus, since once the bus is committed to retrieving a memory value for which the overhead investment is substantial, the load can be allowed to proceed. Since another load request for the same location which was just cancelled could occur soon after the cancel command is allowed to cancel the load, proceeding with the load if the bus cycle has progressed to the driving point allows for more efficient use of the bus.

Figure 5:
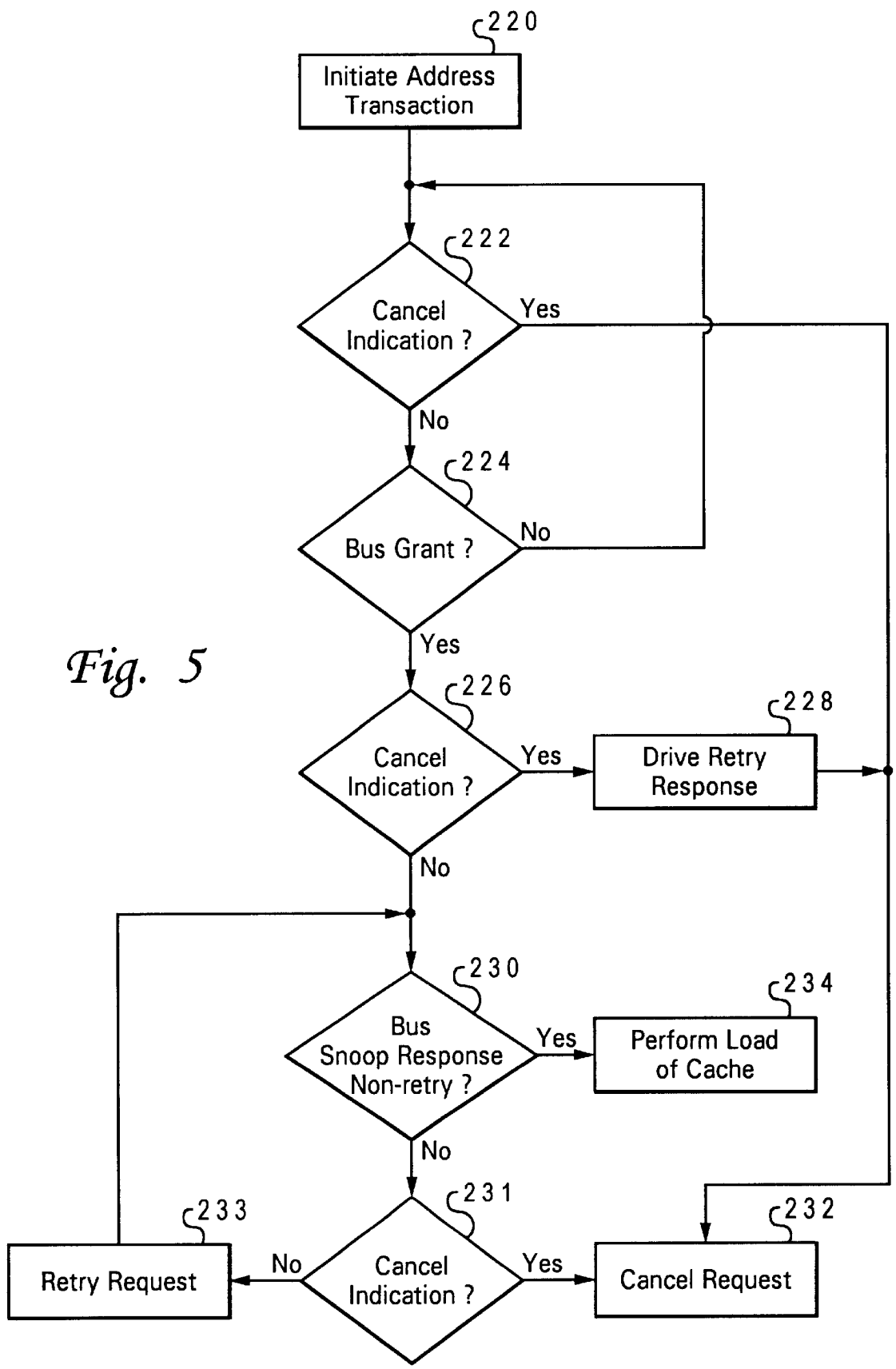
FIG. 5 is a flow diagram showing one embodiment of a decision tree of a method for accessing a memory hierarchy.

FIG. 5 illustrates the mechanics of this decision process. First, an address transaction is initiated (220) on the system bus 284. If a cancel indication has been received at this time (222), the request can be cancelled (232). If the bus has not acknowledged the transaction with a grant response (224), the transaction can be cancelled if a cancel indication is received (222). Once the bus grant indication is received, if a cancel indication is received (226), a retry response will be driven onto the system bus 284 and the request cancelled (232). If a non-retry response is received from the bus prior to any cancel indication being received, the cache is loaded (234). If a retry response is received in step 230, the request will be retried (233) if a cancel indication is not received (231), otherwise the request will be cancelled (232).

Referring now to FIG. 4, one implementation of the present invention uses an L2 cache controller 272 which provides one or more reload queues 280 which contain request tags/flags 282, for each load request, which relate to prefetching. A given reload queue 280 includes a tag portion containing at least a first flag which indicates whether the entry was retrieved as the result of a speculation. The tag portion can also contains a series of bit fields that indicate that the entry is valid and establish a speculation hierarchy. Each entry that represents a cache line that was speculatively loaded dependent on a prior cache line contains the same upper bit field pattern. Bits are set in each successive bit field to indicate a further order of speculation. For example, 16 bits could be provided in a tag field controlling the allocation of 4 sets of cache. The lower eight bits are a identifier unique to the sets. The top eight bits contain the "valid" bit fields, indicating that the cache lines are valid entries. Each bit field is two bits wide, comprising a valid and an invalid flag. The top two bits of the tag field correspond to the first set and correspondingly the set loaded with the lowest order of speculation. The next two lower bits correspond to the next lower order of speculation and so forth. Load requests having a higher order of speculation will have the same bit pattern for all of the bit fields above the bit field corresponding to the their order of speculation and the valid bit set for the order of speculation. The use of two bits presents an advantage in logic making it simpler to test the valid or invalid state.

When a speculative load request is for a line no longer needed, due to a branch-prediction failure for that entry, or a cancel command being received, the request tags 282 that indicate that the entry is valid can be reset to the invalid state. Then, the entries that were requested due to speculative dependence on that entry can be freed. The request queue entries can be scanned via a recursive walk-back algorithm within the queue, wherein queue entries can be continually freed by a process that examines the entries to see if the entry with a lower order of speculation is still valid. Alternatively, combinatorial logic can be used to perform the dependence evaluation and freeing of entries. The entry with a lower order of speculation will have the upper portion of its tag entry in common with entries having dependence on it, all of the entries which correspond to load requests that are speculatively dependent on that lower order entry will have the same bits set as the lower order tag entry. Another technique that may be used in combination is where the cache controlled by L2 cache controller 272 is set associative. A particular set in the cache may be assigned to a branch path and that the walk back for cache lines which are related by dependence may be performed by examining class identifier fields in the cache, as well as the bit field in the tag entry.

Figure 6:
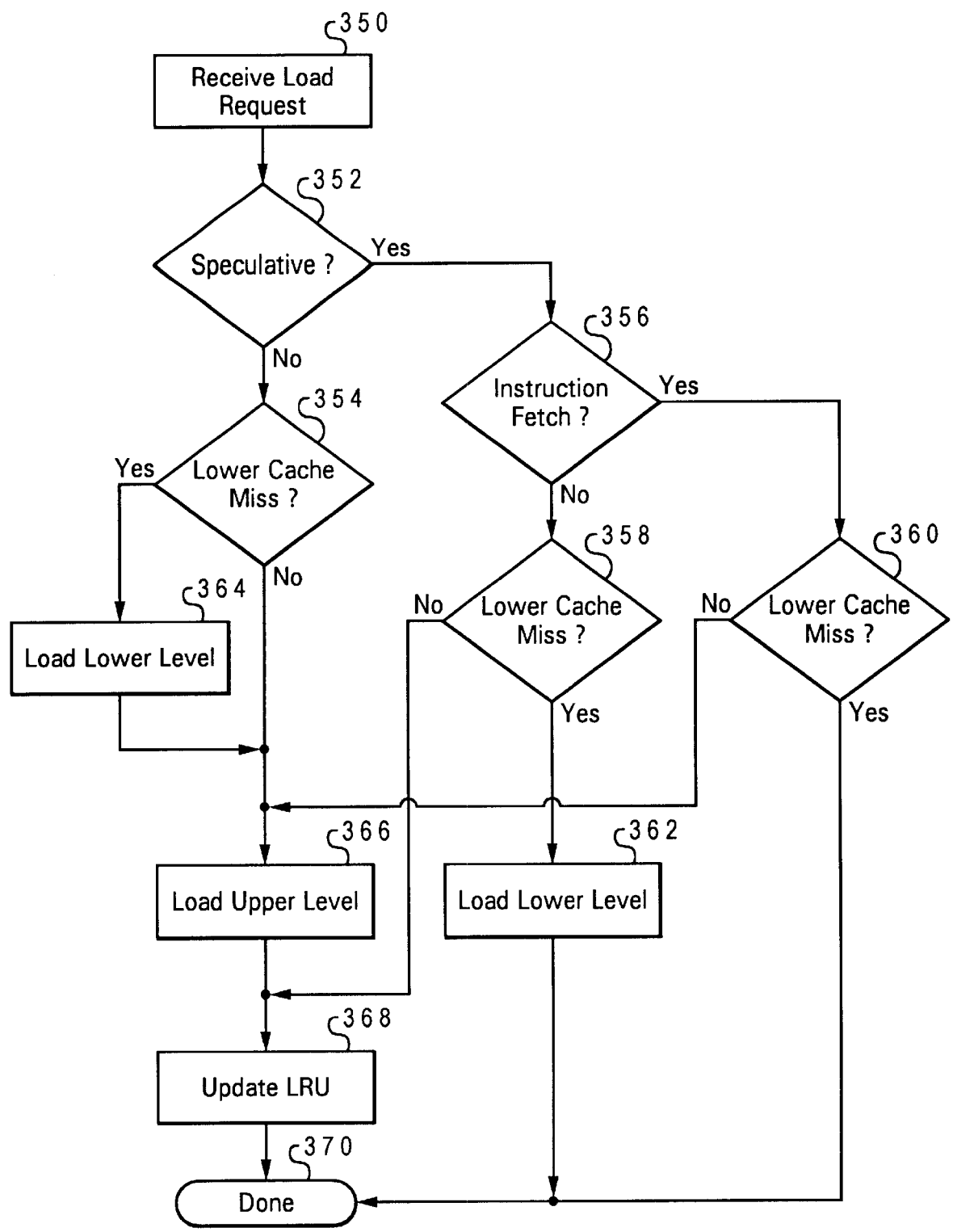
FIG. 6 is a flow diagram of a decision tree for determining actions to take on receipt of a cancel indication in accordance with an embodiment of the present invention.

A further improvement is made to the operation of a multi-level cache hierarchy by the decision algorithm depicted in FIG. 6, which can be performed by the system depicted in FIG. 4, with the upper level corresponding to L1 caches 252 and 256, and the lower level corresponding to L2 cache controller 272. The load request is received by L2 cache controller 272 when L1 cache 252 or 256 is missed. CIU 260 provides indications to L2 cache controller 272 that a load request is either speculative or demand and is for either an instruction or for operand data. Based on this information, speculative loads for operand data are restricted to the cache controlled by L2 cache controller 272, keeping L1 cache 256 free from speculative operand data loads. Since the frequency of instruction fetches exceeds the frequency of operand data fetches ordinarily, this provides an improvement in the hit rate of the L1 D-cache 256.

An even further improvement is also shown in the decision algorithm depicted in FIG. 6. Speculative instruction fetches which miss L1 cache 252 generate load requests and if the cache controlled by L2 cache controller 272 is also missed, no action is performed. This has the effect of keeping speculative instruction loads out of both L1 cache 252 and the L2 cache, unless they are for frequently used instructions, and further provides the benefit of reducing system bus bandwidth use.

The mechanics of the exemplary methods embodied in FIG. 6 are as follows: After a load request is received (350), if the load is not speculative (352) and the lower cache is missed (354), the lower level cache is first loaded (364). Then, the upper level cache is loaded (366), then the LRU is updated (368). For speculative requests, if the request is not for an instruction fetch (356), if the lower cache is missed (358), only the lower level cache is loaded (362). This keeps speculative operand data requests out of the upper level cache. If the lower cache is not missed, the LRU is updated (368). If the speculative request is for an instruction fetch (356) if the lower level cache already contains the prefetch values (360), the upper level cache is loaded (366) and the LRU updated (368), otherwise the request is ignored. This keeps speculative instruction fetches out of the L1 and L2 caches unless they are for frequently used instructions.

Figure 7:
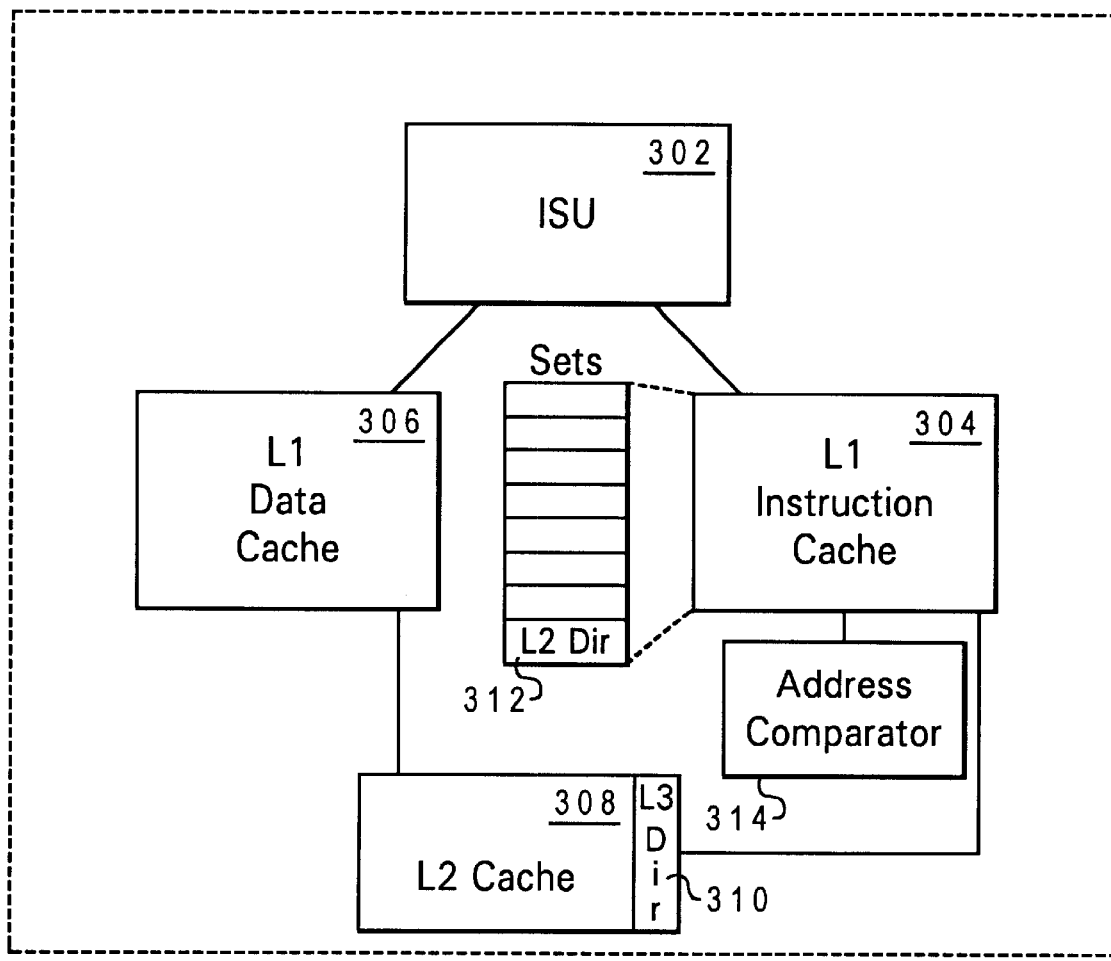
FIG. 7 is a block diagram of a cache memory hierarchy constructed in accordance with one embodiment of the present invention.

The operation of the address comparison needed to determine cache hits or misses can be improved, as well as general access to the directories of memory subsystems in a multi-level memory hierarchy. Referring to FIG. 7, in an exemplary embodiment, this corresponds to the directory of L2 cache 312, but may extend to further levels of cache and storage systems other than semiconductor memory. L1 cache is divided into an L1 instruction cache 304 and an L1 data cache 306. L1 instruction cache 304 is a set associative cache, containing for example eight sets, and at least one of those sets is dedicated to containing the directory for the L2 Cache 312. This provides much faster access to the directory information and much faster address matching to determine cache hits, as the address comparators 314 can be directly connected to the directory set 312 of L1 cache 304. The presence of the L2 Cache directory information in L1 Cache 304 rather than the L2 Cache 308 provides faster access due to the faster access times of the L1 Cache 304. This technique avoids having to load the directory from the L2 cache into the L1 cache, or use techniques commonly known in the art as lookaside or read-through to access the directory directly from the L2 cache 308. The presence of the L2 directory within one or more sets of the L1 cache generally provides the fastest access from memory that is available to the ISU 302.

L2 cache 308 may in turn, contain a directory 310 of the next lower storage subsystem. In a general-purpose processor embodying this technique, provision to reassign the directory set 312 to use as a general purpose set when an external cache is not coupled to the processor, or when desired by system design constraints.

An associative cache with varying latencies among the sets may be used for L1 cache 304 and 306, in that case, choosing a set with a particular latency can provide advantages in accordance with the needs of the particular system. For example, in systems where directory access is very frequent compared to the use of the most frequent ISU instructions, the lowest latency set could be dedicated to use as the directory set 312.

While the above techniques apply to cache memories, and specifically to a hierarchical cache memory structure in a super-scalar processor system, they are adaptable and contemplated to be useful in conjunction with other memory structures and other storage devices within a computer system. For example, the lower-level storage subsystem, which means further from the processor in terms of retrieval, may be a DASD (Direct Access Storage Device), or planar dynamic memory, as well as being the L2 cache 308 of the illustrative embodiment. The upper-level storage subsystem would be the storage subsystem closer in access to the processor, which in the illustrative embodiment includes L1 caches 306 and 304.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method of operating a multi-level cache memory of a computer system, said method comprising:

determining whether or not a lower-level cache is present;

in response to a determination that a lower-level cache is present:

allocating a first portion of a general purpose data store of said higher-level cache as a directory of said lower-level cache and allocating a second portion of said general purpose data store to hold data that can be accessed and processed during instruction execution by a processor of the computer system; and building, within said first portion, a directory describing contents of a data store of said lower-level cache; and in response to a determination that a lower level cache is not present, allocating all of said general purpose data store of said higher-level cache to hold data that can be accessed and processed during instruction execution by a processor of the computer system.

2. The method of claim 1, further comprising:

allocating a portion of said data store of said lower-level cache as a directory of a next-lower-level memory; and building within said allocated portion of said data store of said lower-level cache, a directory describing contents of a data store of said next-lower-level memory.

3. The method of claim 2, wherein said assigning and building steps are performed only in response to a determination that said next-lower-level memory is present.

4. A set-associative higher-level cache comprising:

means for selectively coupling a lower-level cache; and a general purpose data store containing a plurality of sets, wherein a first portion of said sets is allocated for containing a directory of said lower-level cache if said lower-level cache is coupled and a second portion of said sets is allocated to hold data that can be accessed and processed during instruction execution by an associated processor.

5. A multi-level cache hierarchy comprising:

a higher-level cache according to claim 4; and a lower-level cache coupled to said higher-level cache, said lower-level cache including a lower-level cache data store, wherein said lower-level cache data store contains a directory of contents of a next-lower-level memory.

6. The multi-level cache hierarchy of claim 4, and further comprising means for selectively coupling a next-lower-level cache, wherein at least a third portion of said lower-level cache data store is allocated for containing a directory of said next-lower-level memory if said next-lower-level memory is coupled.

7. The set-associative higher-level cache of claim 4, wherein said set-associative higher-level cache comprises a level-one instruction cache.

8. The set-associative higher-level cache of claim 4, and further comprising a special purpose tag directory.

* * * * *